US009794040B2

(12) United States Patent
Larsson et al.

(10) Patent No.: US 9,794,040 B2
(45) Date of Patent: Oct. 17, 2017

(54) PILOT SIGNAL RESOURCE ALLOCATION FOR A CELLULAR MIMO SYSTEM

(71) Applicant: Sony Corporation, Tokyo (JP)

(72) Inventors: Bo Larsson, Malmöö (SE); Erik Bengtsson, Eslöv (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/830,223

(22) Filed: Aug. 19, 2015

(65) Prior Publication Data

US 2016/0285604 A1  Sep. 29, 2016

Related U.S. Application Data

(63) Continuation of application No. PCT/EP2015/056265, filed on Mar. 24, 2015.

(51) Int. Cl.
*H04B 7/02* (2017.01)
*H04L 5/00* (2006.01)
(Continued)

(52) U.S. Cl.
CPC ......... *H04L 5/0048* (2013.01); *H04B 7/0413* (2013.01); *H04L 5/005* (2013.01);
(Continued)

(58) Field of Classification Search
CPC .................................................. H04B 7/0456
(Continued)

(56) References Cited

U.S. PATENT DOCUMENTS

2010/0246548 A1*  9/2010  Bahng .................. H04B 7/0452
370/338
2010/0329374 A1* 12/2010  Pi .......................... H04L 5/0007
375/260
2015/0304090 A1  10/2015  Ko et al.

FOREIGN PATENT DOCUMENTS

WO  2014088271 A1  6/2014

OTHER PUBLICATIONS

International Search Report and Written Opinion; Dec. 23, 2015; issued in International Patent Application No. PCT/EP2015/056265.

* cited by examiner

*Primary Examiner* — Lihong Yu
(74) *Attorney, Agent, or Firm* — James C. Edwards; Moore & Van Allen, PLLC

(57) ABSTRACT

The present invention relates to a method for allocating resources for a transmission of pilot signals of a plurality of terminals (18-23, 24-27) of a cellular multiple-input and multiple-output, MIMO, system. The cellular MIMO system (40) comprises at least a first base station (10) and a second base station (15), wherein each of the first and second base stations (10, 15) has a plurality of antennas (13) and a logic (12) which analyzes pilot signals received from a terminal (18-23, 24-27) at the plurality of antennas (13) to obtain information about radio channel properties between the terminal (18-23, 24-27) and the plurality of antennas (13). According to the method, the first base station (10) determines a first resource (1-3) used for transmission of pilot signals of a first terminal (18-23) and a usage type indicating a usage of the first resource (3). The usage type and information about the first resource (1-3) is transmitted from the first base station (10) to the second base station (15). The second base station allocates based on the usage type and the (Continued)

information about the first resource (1-3) a second resource (2) for a transmission of pilot signals of a second terminal (27) to obtain information about properties of a radio channel between the second terminal (27) and the plurality of antennas (13) of the second base station (15).

10 Claims, 2 Drawing Sheets

(51) Int. Cl.
     *H04B 7/0413*     (2017.01)
     *H04W 72/04*      (2009.01)
     *H04W 88/08*      (2009.01)

(52) U.S. Cl.
     CPC .......... *H04L 5/0035* (2013.01); *H04L 5/0051* (2013.01); *H04L 5/0073* (2013.01); *H04L 5/0092* (2013.01); *H04W 72/048* (2013.01); *H04W 88/08* (2013.01)

(58) Field of Classification Search
     USPC ........................................................ 375/267
     See application file for complete search history.

PILOT SIGNAL RESOURCE ALLOCATION FOR A CELLULAR MIMO SYSTEM

FIELD OF THE INVENTION

The present invention relates to cellular communication systems. Embodiments of the present invention relate in particular to methods and devices for resource allocation for pilot signals used in cellular multiple-input and multiple-output (MIMO) systems. The present invention relates to a method and MIMO base station for allocating resources, for example time slots, for pilot signals used for adjusting antenna transmitters and receivers in MIMO systems.

BACKGROUND OF THE INVENTION

Mobile data and voice communication is significantly growing. With increasing popularity of data and voice communication, it is more likely that the communication needs of a large number of users must be met which are all located within a small area, a place referred to as dense crowd scenario in the art. Typical examples include sport arenas or large office buildings.

In order to increase data transmission performance and reliability, the so-called multiple-input and multiple-output (MIMO) technology may be used in wireless radio telecommunication for transmitting information between a base station and terminals of users. The MIMO technology is therefore known in the industry as one of the potential candidates for evolving mobile communication systems. MIMO systems may use multiple send and receive antennas for wireless communication at a base station. The MIMO technology forms the basis for coding techniques which use the temporal as well as the spatial dimension for transmitting information. The enhanced coding provided in MIMO systems allows a quality and data rate of the wireless communication to be increased.

In a so-called massive MIMO system, the base station may include a large number of antennas, for example several tens or even in excess of one hundred antennas with associated transceiver circuitry. The large number of antennas of the MIMO base station allows radio energy to be spatially focused with improved capacity and radiated energy efficiency. In order to adapt the transmit signal at each individual antenna of the base station in accordance with the currently active receiving terminals, a base station logic needs information about radio channel properties between the terminals and the antennas. A pilot signaling scheme may be used for this purpose which allows the base station to adjust configuration antenna parameters for transmitting signals so as to focus radio energy at terminals or for receiving radio signals. In a MIMO system, pilot signals may be transmitted from all terminals within the cell and possibly also neighboring cells in a time slot which is dedicated to the respective terminal. The pilot signals need to be orthogonal in order for the base station to identify the configuration parameters of the plurality of antennas for each of the terminals. Orthogonality may be achieved for example by using time division multiple access (TDMA), code divisional multiple access (CDMA) or frequency division multiple access (FDMA) technologies or a combination thereof.

In case the MIMO system uses for example a time division duplex (TDD) technology for communicating data between the base station and the terminal, each terminal may transmit a pilot signal in a designated time slot, which can be received by the antennas and analyzed by the base station logic. It will be appreciated that time slots are only one example for orthogonal channels, which orthogonality being attained in the time domain. In order to not interfere with each other, a certain time period can be assigned in each system frame where each terminal may transmit its pilot signal. The time slots in which terminals may transmit their pilot signals in combination are also referred to as a pilot portion of the frame and may be a part of a header of the frame. The remaining time slots of the frame may be used for downlink (DL) and uplink (UL) data transmission. The DL and UL transmissions may be performed in a plurality of time slots which may follow the header of the frame. The pilot signals may each include a training sequence, which the pilot signal received at the plurality of antennas of the base station being analyzed by the base station logic. The base station may use the results of the analysis to determine configuration parameters for transmitting signals via the antennas to the respective terminals or for receiving signals via the antennas from the respective terminals.

Massive MIMO systems may be deployed in buildings such as office buildings, shopping malls and so on, in which a large density of users can occur. In such environments a large number of terminals may be located in a single cell served by the MIMO base station. The time required for the pilot signaling of the terminals in each frame may increase with the number of terminals. For a large number of terminals, the time required for all terminals to transmit their pilot signals may exceed the available pilot signaling time in each frame. While the pilot signaling time, i.e. the number of time slots allocated to pilot signaling, may be adjusted dynamically, the transmission of payload data may be negatively affected if the pilot signaling time was increased too much. Therefore, several terminals may be grouped or clustered to share one of several orthogonal channels for pilot signal transmission. For illustration, in TDD, several terminals may share the same pilot time slot. The several terminals may be assigned to the one of the several orthogonal channels for pilot signal transmission. For example, the several terminals may be assigned to the same pilot time slot in such a manner that the several terminals do no longer transmit their respective pilot signals in each frame, but alternating transmit their pilot signal in the assigned time slot. Similar assignments can be made for other types of orthogonal channels. The several terminals may transmit their pilot signals in a round-robin fashion. Thus, resources for pilot signal transmission, for example orthogonal channels, may be saved or used more efficiently. Thus, grouping or clustering of terminals is one option to handle limitation in the spatial resolution.

However, further obstacles may occur in MIMO systems in view of resources to be used for transmitting pilot signals, when a plurality of base stations of neighboring cells is considered. The resources, for example time slots or otherwise orthogonal channels, may be distributed over the base stations to avoid that a pilot signal from one terminal to a first base station is contaminated by another pilot signal from another terminal sent to a second base station using the same resource. However, this may limit the available resources for transmitting pilot signals.

Therefore, there is a need in the art for methods and devices which address at least some of the above shortcomings in MIMO systems. There is in particular a need in the art for allocating resources for pilot signaling to terminals of a multiple-input and multiple-output (MIMO) system in which a plurality of base stations are serving a plurality of neighboring cells and the total number of terminals becomes large, for example larger than the number of available time slots in a pilot portion of a frame.

SUMMARY OF THE INVENTION

According to the present invention, these objectivs are achieved by a method for allocating resources for a transmission of pilot signals of a plurality of terminals of a cellular multiple-input and multiple-output systems as defined in claim 1, a base station for a cellular multiple-input and multiple-output system as defined in claim 6, a base station for a cellular multiple-input and multiple-output system as defined in claim 8, and a cellular multiple-input and multiple-output system as defined in claim 10. The dependent claims define preferred and advantageous embodiments of the present invention.

According to embodiments of the present invention, methods and devices are provided which allow to share resources for the transmission of pilot signals between cells of a cellular multiple-input and multiple-output (MIMO) communication system in order to keep the contamination or inference between the transmitted pilot signals low. Therefore, a base station which reuses a resource already used by a neighboring cell considers the usage of the resource in the neighboring cell and prioritizes the reuse of this resource based on the usage in the neighboring cell. For example, if a resource is used in a neighboring cell for transmitting pilot signals of a plurality of clustered or grouped terminals, the base station may use this resource with a lower priority than a resource which is used in the neighboring cell for transmitting a pilot signal from a single terminal only.

Hence, according to an embodiment of the present invention, a method for allocating resources for a transmission of pilot signals of a plurality of terminals of a cellular multiple-input and multiple-output (MIMO) system is provided. The cellular MIMO system comprises at least a first base station and a second base station. The first base station may serve a first cell of the cellular system and the second base station may serve a neighboring second cell of the cellular system. The first base station has a plurality of antennas and a logic which analyzes pilot signals received from a terminal at the plurality of antennas to obtain information about radio channels properties between the terminal and the plurality of antennas. Likewise, the second base station has a plurality of antennas and a logic which analyzes pilot signals received from a terminal at the plurality of antennas to obtain information about radio channel properties between the terminal and the plurality of antennas. The terminals may comprise for example mobile telephones, mobile or stationary computing devices, like a tablet PC, or any other kind of device capable of wirelessly transmitting voice or data information to and from a base station of a cellular communication network. According to the method, a first resource is determined by the first base station. The first resource is used for transmission of pilot signals of a first terminal to obtain information about properties of a radio channel between the first terminal and the plurality of antennas of the first base station. Furthermore, a usage type is determined by the first base station. The usage type indicates a usage of the first resource, e.g. if the first resource is used for transmitting pilot signals of a single terminal device or of a cluster of terminal devices. In case the usage type indicates that the first resource is used for transmitting pilot signals of a cluster of terminal devices, the usage type may include additional information concerning the cluster, for example the number of terminals devices involved in the cluster of terminal devices. The usage type is transmitted from the first base station to the second base station. For example, the first base station may transmit the usage type to the second base station upon for example determining the usage type, or assigning a pilot signal to the first resource, or in regular intervals, or when the number of terminal devices in a cluster changes (a so-called push operation). Additionally or as an alternative, the second base station may send a request to the first base station for requesting the usage type. The first base station may transmit the usage type to the second base station upon receiving the request (a so-called pull operation). Additionally, information about the first resource may be transmitted from the first base station to the second base station, for example information characterizing the first resource, for example a time slot information, a frequency information or a coding information. Based on the usage type and the information about the first resource the second base station allocates a second resource for transmitting pilot signals of a second terminal to obtain information about properties of a radio channel between the second terminal and the plurality of antennas of the second base station. Therefore, the second base station can select the second resource such that pilot signal transmissions in the cell served by the first base station are disturbed as little as possible. For example, if the usage type indicates that the first resource is involved in a pilot signal transmission of high priority, because for example the resource is shared for a group or cluster of first terminals, the second base station may select a resource which is different from the first resource as the second resource. Conversely, if the first resource is involved in a pilot signal transmission to a single terminal only which may additionally be arranged in a far distance from the second cell served by the second base station, the second base station may reuse the first resource as the second resource for a pilot signal transmission in the second cell served by the second base station. To sum up, the idea is to share resources between the cells for use by pilot signals, but to keep the contamination or inference as low as possible. For example, if the information about grouping or clustering of terminals is shared between the base stations, the neighboring cell may prioritize a reuse of the resource for the clustered pilots lower. This may lower the probability for a contamination or interference of a higher number of terminals compared to a single terminal.

In detail, the usage type may comprise for example a type indicating that the first resource is used by a the first base station exclusively for transmission of pilot signals of a single first terminal to obtain information about properties of a radio channel between the first terminal and the plurality of antennas of the first base station. In other words, this usage type indicates that the first resource is used in connection with a single terminal only and therefore a priority to reuse this first resource by another base station may be set high, as only a single terminal may be affected. Another usage type may indicated that the first resource is used by the first base station commonly for a transmission of pilot signals of a plurality of first terminals to obtain information about properties of radio channels between each of the plurality of first terminals and the plurality of antennas of the first base station. As the resource is used for a group or cluster of terminals a reuse of this resource could influence a radio transmission of a plurality of first terminals. Therefore, a priority to reuse the first resource in this case could be set lower to avoid contamination or interference of a plurality of first terminals. Furthermore, the usage type may indicate that the resource is currently not used by the first base station for pilot signaling.

The information about the first resource may comprise for example a time slot information of a time division multiplexing scheme which is used in the cellular MIMO system for transmitting orthogonal pilot signals in order for the base station to identify the configuration parameters for the plurality of antennas for each of the terminals, for example for the first terminal. Additionally or as an alternative, in case a code division multiple access scheme is used in the cellular MIMO system, a coding information may be provided as the information about the first resource. Additionally or as an alternative, also a frequency information may be comprised by the information about the first resource in case a frequency division multiplexing scheme is used in the cellular MIMO system. Therefore, the above-described method for sharing resources for pilot signaling among a plurality of base stations may be used in connection with a wide variety of multiplexing schemes used in cellular MIMO systems.

Based on the usage type and the information about the first resource, the second base station may allocate the first resource as the second resource, for example, if the first resource is not involved in a grouping or clustering pilot signal transmission in the cell of the first base station. Furthermore, in case the first resource is reused by the second base station, the second base station may allocate this resource only for pilot signaling of a single terminal and not for a group of terminals.

After allocating the second resource, the second base station may request the second terminal to transmit pilot signals using the second resource. Based on pilot signals received via the second resource, the second base station may obtain information about properties of a radio channel between the second terminal and the plurality of antennas of the second base station. Based on the obtained information about the properties of the radio channel, the second base station may configure receivers and transmitters coupled to the plurality of antennas of the second base station. Various techniques may be used for controlling a transmission via the antennas when transmitting signals to a plurality of terminals in a cellular MIMO system. For illustration, a footprint matrix may be determined based on the received pilot signal. The base station logic may compute a Hermitian conjugate of the footprint matrix and may control transmission of the signal by the plurality of antennas to direct a transmit signal into an angular sector in which the terminal is located from which the pilot signal was received. The base station logic may compute the Hermitian conjugate of the footprint matrix and may control transmission of the signal by the plurality of antennas such that radio energy is focused in an area in which the terminal is located which sent the pilot signal.

According to another aspect of the present invention, a base station for a cellular multiple-input and multiple-output (MIMO) system is provided. The base station comprises a plurality of antennas and a logic coupled to the plurality of antennas. The logic is configured to analyze pilot signals received from a terminal at the plurality of antennas to obtain information about radio channel properties between the terminal and the plurality of antennas. The logic is furthermore configured to determine a resource used for a transmission of pilot signals of the terminal to obtain information about properties of a radio channel between the terminal and the plurality of antennas. Furthermore, the logic of the base station is configured to determine a usage type indicating a usage of the resource. The base station may comprise additionally an interface for communicating with another base station. Via this interface the logic of the base station transmits the usage type and information about the resource to the other base station. Thus, the base station may act as the first base station described above in the methods of the present invention.

According to a further aspect, a base station for a cellular multiple-input and multiple-output (MIMO) system is provided. The base station comprises a plurality of antennas and a logic coupled to a plurality of antennas and configured to analyze pilot signals received from the terminal at the plurality of antennas to obtain information about radio channel properties between the terminal and the plurality of antennas. The logic is furthermore configured to receive a usage type and information about a first resource from another base station. The first resource is used by the other base station for a transmission of pilot signals of a first terminal to obtain information about properties of a radio channel between the first terminal and a plurality of antennas of the other base station. The usage type indicates a usage of the first resource for pilot signaling in a cell served by the other base station. Based on the received usage type and information about the first resource, the logic is furthermore configured to allocate a second resource for a transmission of pilot signals of a second terminal to obtain information about properties of a radio channel between the second terminal and the plurality of antennas of the base station. Therefore, the base station may operate as the second base station of the above-described methods.

The features of the two above-described base stations may be combined within each base station of a cellular MIMO system, such that each base station of the cellular MIMO system may act as the first base station and as the second base station as well. The communication between the base stations of the cellular MIMO system may be accomplished by any kind of data transmission, for example a wireless data transmission or via a backbone network. For example, the usage type and information about the first resource may be transmitted from the first base station to the second base station via a control plane signaling over a standardized interface between the first base station and the second base station, for example via the so-called X2 interface in LTE networks. Accordingly, a cellular multiple-input and multiple-output (MIMO) system according to an aspect of the present invention comprises a plurality of base stations as defined above, for example at least a first base station and a second base station.

The base stations of the cellular MIMO system may be configured for a communication according to the so-called long term evolution (LTE) cellular communication network standard. The terminal may comprise a mobile telephone. Additionally or as an alternative, the base stations of the cellular MIMO system may be configured for a communication in a wireless local area network (WLAN), e.g. according to the IEEE 802.11 standards. Massive MIMO may also be supported by the base stations in e.g. WLAN environments, and the base stations may act as coordinated access points (AP) in e.g. an office building or an airport.

In any of the various embodiments, the MIMO system may be a massive MIMO system. The base stations, for example the first base station and the second base station, may include more than ten antennas, for example several tens of antennas, to transmit signals. The base stations may include more than one hundred antennas to transmit signals. The base station antennas may be distributed. The plurality of antennas may comprise several subsets located at several locations remote from one another. The several subsets may interact with one another in corporative MIMO.

Embodiments of the invention may be used for pilot signaling resource allocation in MIMO systems, in particular in massive MIMO systems. Exemplary scenarios where sharing of pilot signal resources between two or more base stations may be particularly useful include dense crowd scenarios, for example sport arenas, in which data is broadcast. For illustration, embodiments of the invention may be used for video streaming or other data streaming applications in dense crowd scenarios.

Although specific features described in the above summary and in the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

Embodiments of the invention will be described in more detail with reference to the accompanying drawings.

DETAILED DESCRIPTION OF THE PREFERRED EMBODIMENTS

In the following, exemplary embodiments of the present invention will be described in more detail. It is to be understood that the features of the various exemplary embodiments described herein may be combined with each other unless specifically noted otherwise. Same reference signs in the various drawings refer to similar or identical components. Any coupling between components or devices shown in the figures may be a direct or indirect coupling unless specifically noted otherwise.

Figure 1:
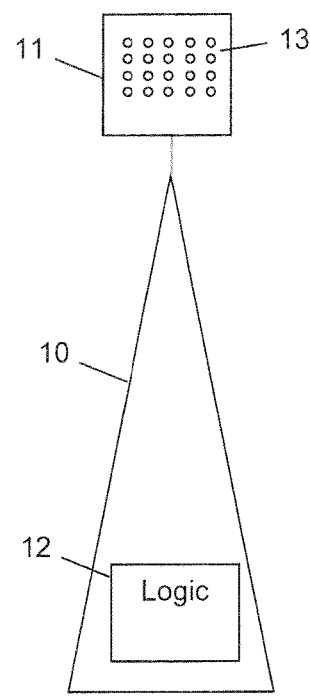
FIG. 1 shows schematically a base station according to an embodiment of the present invention.

FIG. 1 shows schematically a base station 10 according to an embodiment of the present invention, which may be used in a cellular multiple-input and multiple-output (MIMO) communication system. Therefore, in the following, the base station 10 will be also called MIMO base station. The MIMO base station 10 comprises an antennas array 11 including a plurality of antennas 13. The MIMO base station 10 may have large number of antennas 13, such as several tens or in excess of one hundred antennas. The antennas 13 may be arranged in a two- or three-dimensional spatial array on a carrier. The base station 10 also comprises associated transceivers for the antennas 13. The plurality of antennas may also be spatially distributed to various locations, for example in corporative MIMO. It is also possible that several base stations interact in corporative MIMO, with the plurality of antennas being distributed over various locations.

The base station 10 is configured to analyze a pilot signal received from a terminal at the plurality of antennas 13 of the base station 10 to determine channel characteristics for a radio signal transmission between the plurality of antennas 13 of the base station 10 and the terminal. For illustration, a logic 12 of the base station 10 may be configured to determine a footprint matrix based on a pilot signal received by the plurality of antennas 13 from a terminal. The logic 12 may use the footprint matrix to control the plurality of antennas 13 when transmitting radio signals to the terminal. The logic 12 may compute a Hermitian conjugate of the footprint matrix to determine time delays and amplitudes of radio signals transmitted by each of the plurality of antennas 13 to focus a radio energy in a sector in which the terminal is located. For example, the logic 12 may control a transmission of signals via the plurality of antennas 13 based on radio channel properties, for example based on a footprint matrix, obtained for a pilot signal transmission from a terminal to control a transmission of signals by the plurality of antennas 13 to transmit a downlink (DL) signal carrying control signaling or payload data to a spatial sector in which the terminal is located. The control may be performed in such a way that focusing of radio energy is not only performed as a function of direction, but also as a function of distance from the base station 10. For example, for several terminals located in the same direction and at similar distance from the base station, the base station 10 may control the transmission of signals trough the plurality of antennas 13 in such a way that the radio energy is focused in the direction in which the terminals are located and at the distance at which the terminals are located.

Figure 2:
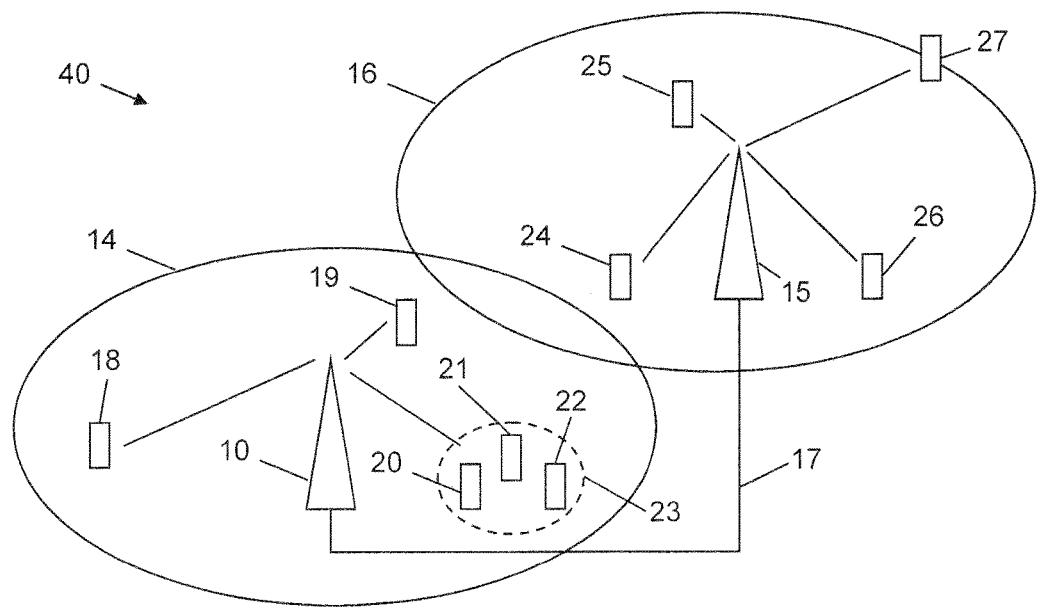
FIG. 2 shows schematically a cellular multiple-input and multiple-output system according to an embodiment of the present invention.

FIG. 2 shows an exemplary cellular MIMO system 40 comprising two cells 14 and 16. The cell 14 is served by the base station 10 and the cell 16 is served by a base station 15 which may have the same structure as the base station 10 described above. The cells 14 and 16 are arranged as geographically neighboring cells. A communication link 17 between the base stations 10 and 15 is provided by for example a wired backbone network or any other kind of wired or wireless connection. In each cell 14, 16 a plurality of terminals are located. The terminals may comprise for example mobile telephones or any other kind of communication device using a wireless data communication, for example a mobile communication device arranged in a vehicle for emergency purposes. In detail, terminals 18-23 are arranged in cell 14 and terminals 24-26 are arranged in cell 16. Additionally, a further terminal 27 is currently entering cell 16.

The communication system 40 is a multiple-input and multiple-output (MIMO) system. The MIMO system 40 may be a massive MIMO system. As described above, each of the base stations 10, 15 comprise a plurality of antennas 13 for operating the base station in the MIMO system. The terminals 18-22 and 24-27 are configured to communicate with the base stations 10 and 15, respectively. Each of the terminals 18-22 and 24-27 is configured to transmit a pilot signal to a corresponding base station 10, 15. Each pilot signal may include a training sequence, i.e., the pilot signal may be a MIMO pilot signal. The base stations 10, 15 are configured to analyze the pilot signals received at the plurality of antennas of the corresponding base stations to determine channel characteristics for a radio signal transmission between the plurality of antennas 13 of the corresponding base station 10, 15 and the respective terminal 18-22 and 24-27. As the resources for transmitting pilot signals are limited, a group or cluster of terminals may share a single resource in a time division multiplex manner. In FIG. 2 the terminals 20-22 may share a common pilot signal resource in a time division multiplex manner and are therefore designated as members of a cluster or group 23.

Figure 4:
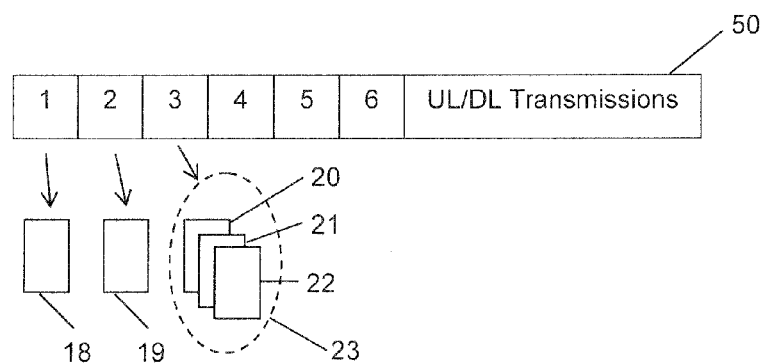
FIG. 4 illustrates an assignment of pilot signal time slots for transmitting pilot signals according to an embodiment of the present invention.
Figure 5:
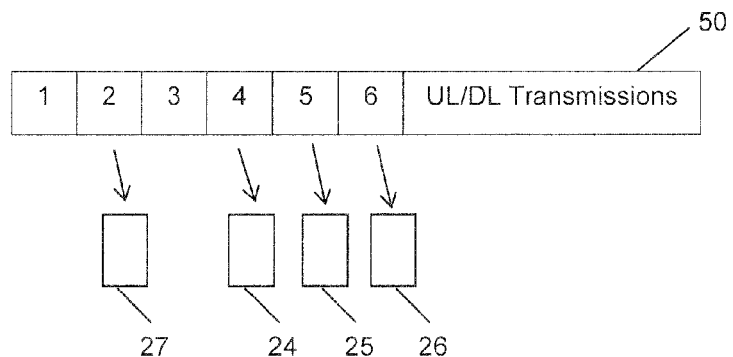
FIG. 5 illustrates a further assignment of pilot signal time slots for transmitting pilot signals according to an embodiment of the present invention.

As can be seen from FIG. 2, neighboring cells 14 and 16 may be overlapping to some extent and therefore pilot signals using the same resources in cells 14 and 16 may interfere with each other. Consequently, distinct resources may be used for the pilot signals in the neighboring cells 14 and 16. For example, if six resources, for example time slots, are available in the data transmission frames for pilot signaling, these resources may be assigned to the terminals as illustrated in the following in connection with FIGS. 4 and 5. A transmission frame 50 may provide resources 1-6 for the transmission of six different and separate pilot signals. Furthermore, the transmission frame 50 may comprise space for uplink (UL) or downlink (DL) transmissions of signaling and payload data. In cell 14 resource 1 may be assigned for pilot signaling of terminal 18, resource 2 may be assigned for pilot signaling of terminal 19 and resource 3 may be assigned for pilot signaling of the terminal cluster 23 comprising terminals 20-22 (see FIG. 4). In cell 16 resource 4 may be allocated for pilot signaling of terminal 24, resource 5 may be allocated for pilot signaling of terminal 25 and resource 6 may be allocated for pilot signaling of terminal 26 as shown in FIG. 5. Therefore, all resources 1-6 are in use by the base stations 10 and 15. However, as shown in FIG. 2, an additional terminal 27 may be entering into cell 16 and a resource for pilot signaling needs to be assigned to terminal 27. In order to keep the contamination or interference of the pilot signaling used in the cells 14 and 16 as low as possible, the method steps shown in FIG. 3 may be performed by the base stations 10 and 15.

Figure 3:
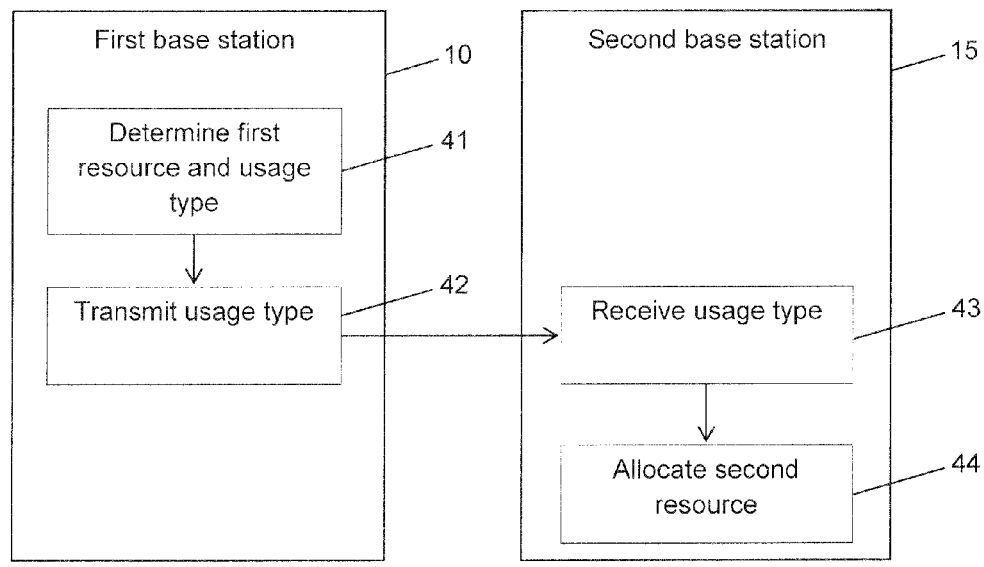
FIG. 3 is a flowchart of the method performed by base stations according to an embodiment of the present invention.

As shown in FIG. 3, the first base station 10 of cell 14 determines the resources (first resource) used for pilot signaling in cell 14, i.e. the resources 1, 2 and 3. Furthermore, for each of these resources 1-3 the first base station 10 determines the usage type of the resource and/or of the radio channel associated to the terminal using the resource (step 41). For example, the first base station may determine that resource 3 is used for pilot signaling of a plurality of terminals 20-22, i.e., resource 3 is used in connection with clustered terminals. In case one of the resources used in cell 14 shall be reused in cell 16 for providing a pilot signaling resource for the additional terminal 27, this usage type information may be advantageously considered. For example, in step 42 the first base station 10 may transmit the resource allocation and the corresponding usage types to the second base station 15, and the second base station 15 may receive this information in step 43 and allocate a resource (second resource) for the pilot signaling of the additional terminal 27 in step 44. For example, the second base station 15 may only consider those resources for pilot signaling of the additional terminal 27 which are not involved in pilot signaling of terminal clusters (for example cluster 23). As an alternative, the first base station 10 may transmit only those resources to the second base station 15 for a reuse which are not used in the own cell 14 for pilot signaling of clustered terminals. Furthermore, based on the usage type a priority list may be set up either in the first base station 10 or in the second base station 15 and based on the priority list, the resource with the lowest priority may be selected by the second base station 15 to allocate this resource for a pilot signaling of the additional terminal 27. In the example described above, the resource 2 may have the lowest priority and may be therefore reused by the second base station 15 for pilot signaling of the additional terminal 27 as shown in FIG. 5. Consequently, this lowers the probability for contamination of a higher number of terminals compared to a selection of resource 3 for pilot signaling of terminal 27.

To sum up, the idea is to share between the cells the resources used for pilot signaling in order to keep the contamination low. For example, if the clustering information is shared via the usage type with the neighboring cell, the neighboring cell is able to prioritize reuse of resources used for pilot signaling of clustered terminals lower. If a base station reuses or takes a resource from a neighboring base station, it may also send back a message in advance of doing it. Then, the base station that may experience interference is prepared or is able to cluster devices before it is being dropped. In congested scenarios a base station may decide to cluster the terminals in order to free up resources.

The invention claimed is:

1. A method of allocating resources for a transmission of pilot signals of a plurality of terminals of a cellular multiple-input and multiple-output, MIMO, system, the cellular MIMO system comprising at least a first base station and a second base station, each of the first and second base stations having a plurality of antennas and a logic which analyzes pilot signals received from a terminal at the plurality of antennas to obtain information about radio channel properties between the terminal and the plurality of antennas, the method comprising:

determining, by the first base station, a first resource used for a transmission of pilot signals of a first terminal to obtain information about properties of a first radio channel between the first terminal and the plurality of antennas of the first base station, wherein the first resource is comprised in a time slot within a data transmission frame, determining, by the first base station, a usage type indicating a usage of the first resource, wherein the usage type that is determined is one of (1) the first resource is used for transmitting pilot signals of a single first terminal device, and (2) the first resource is used for transmitting pilot signals of a cluster of first terminal devices, transmitting, from the first base station to the second base station, the usage type and information about the first resource, and allocating, by the second base station and based on the usage type and the information about the first resource, a second resource for a transmission of pilot signals of a second terminal to obtain information about properties of a second radio channel between the second terminal and the plurality of antennas of the second base station.

2. The method according to claim 1, wherein the usage type comprises:

the first resource being used by the first base station commonly for a transmission of pilot signals of the cluster of first terminal devices to obtain information about properties of radio channels between each of the first terminal devices and the plurality of antennas of the first base station.

3. The method according to claim 1, wherein the step of allocating comprises:

allocating the first resource as the second resource based on the usage type and the information about the first resource.

4. The method according to claim 1, further comprising:

requesting, by the second base station, the second terminal to transmit pilot signals using the second resource.

5. The method according to claim 1, wherein transmitting the usage type and information about the first resource from the first base station to the second base station comprises:

transmitting the usage type and information about the first resource between the first base station and the second base station.

6. A cellular multiple-input and multiple-output, MIMO, system for allocating resources for a transmission of pilot signals of a plurality of terminals, the system comprising:
   a first base station; and
   a second base station;
   wherein each of the first and second base stations includes a plurality of antennas and a logic, which analyzes pilot signals received from a terminal of the plurality of terminals at the plurality of antennas to obtain information about radio channel properties between the terminal and the plurality of antennas,
   wherein the logic of the first base station is further configured to:
   determine a first resource used for a transmission of pilot signals of a first terminal to obtain information about properties of a first radio channel between the first terminal and the plurality of antennas of the first base station, wherein the first resource is comprised in a time slot within a data transmission frame,
   determine a usage type indicating a usage of the first resource, wherein the usage type that is determined is one of (1) the first resource is used for transmitting pilot signals of a single first terminal device, and (2) the first resource is used for transmitting pilot signals of a cluster of first terminal devices, and
   transmit the usage type and information about the first resource to the second base station,
   wherein the logic of the second base station is configured to:
   allocate, based on receiving the usage type and the information about the first resource, a second resource for a transmission of pilot signals of a second terminal to obtain information about properties of a second radio channel between the second terminal and the plurality of antennas of the second base station.

7. A base station for a cellular multiple-input and multiple-output, MIMO, system, the base station comprising:
   a plurality of antennas; and
   a logic coupled to the plurality of antennas and configured to
   analyze pilot signals received from a terminal at the plurality of antennas to obtain information about radio channel properties between the terminal and the plurality of antennas,
   determine a resource used for a transmission of pilot signals of the terminal to obtain information about properties of a radio channel between the terminal and the plurality of antennas,
   determine a usage type indicating a usage of the resource, wherein the usage type that is determined is one of (1) the first resource is used for transmitting pilot signals of either a single first terminal device and (2) the first resource is used for transmitting pilot signals of a cluster of first terminal devices, and
   transmit the usage type and information about the resource to another base station, wherein the base station is configured to execute the method according to claim 2.

8. A cellular multiple-input and multiple-output, MIMO, system for allocating resources for a transmission of pilot signals of a plurality of terminals, the system comprising:
   a first base station; and
   a second base station;
   wherein each of the first and second base stations includes a plurality of antennas and a logic, which analyzes pilot signals received from a terminal of the plurality of terminals at the plurality of antennas to obtain information about radio channel properties between the terminal and the plurality of antennas,
   wherein the logic of the first base station is further configured to:
   transmit a usage type and information about a first resource to the second base station, wherein the first resource is comprised in a time slot within a data transmission frame, and
   wherein the logic of the second base station is configured to:
   receive the usage type, wherein the usage type is one of (1) the first resource is used for transmitting pilot signals of a first terminal to obtain information about properties of a first radio channel between the first terminal and the plurality of antennas of the first base station, and (2) the first resource is used for transmitting pilot signals of a cluster of first terminal devices, and
   allocate, based on receiving the usage type and the information about the first resource, a second resource for a transmission of pilot signals of a second terminal to obtain information about properties of a second radio channel between the second terminal and the plurality of antennas of the second base station.

9. A base station for a cellular multiple-input and multiple-output, MIMO, system, the base station comprising:
   a plurality of antennas; and
   a logic coupled to the plurality of antennas and configured to
   analyze pilot signals received from a terminal at the plurality of antennas to obtain information about radio channel properties between the terminal and the plurality of antennas,
   receive a usage type, wherein the usage type indicates whether a first resource is used for transmitting pilot signals of either a single first terminal device or whether the first resource is used for transmitting pilot signals to a cluster of first terminal devices, and information about a first resource, wherein the first resource is comprised in a time slot within a data transmission frame and used by another base station for a transmission of pilot signals of a first terminal to obtain information about properties of a radio channel between the first terminal and a plurality of antennas of the other base station, the usage type indicating a usage of the first resource, and
   allocate, based on the usage type and the information about the first resource, a second resource for a transmission of pilot signals of a second terminal to obtain information about properties of a radio channel between the second terminal and the plurality of antennas, wherein the base station is configured to execute the method according to claim 2.

10. A cellular multiple-input and multiple-output, MIMO, system, comprising:
   a first base station according to claim 6, or
   a second base station according to claim 8.

* * * * *